(12) United States Patent
Poppell (10) Patent No.: US 7,516,632 B2
(45) Date of Patent: Apr. 14, 2009

(54) REMOTELY CONTROLLED TOOL BOX LOCK APPARATUS

(76) Inventor: James W. Poppell, 1869 Pisgah Rd., Perry, FL (US) 32347

( * ) Notice: Subject to any disclaimer, the term of this patent is extended or adjusted under 35 U.S.C. 154(b) by 39 days.

(21) Appl. No.: 11/593,075

(22) Filed: Nov. 6, 2006

(65) Prior Publication Data

US 2008/0105012 A1    May 8, 2008

(51) Int. Cl.
*E05B 47/00*    (2006.01)
(52) U.S. Cl. .................... 70/279.1; 70/159; 70/257; 70/283; 70/379 R; 70/379 A; 296/37.6
(58) Field of Classification Search ........... 70/159–162, 70/257, 279.1, 277, 278.7, 283, 283.1, 278.3, 70/256, 379 R, 379 A; 292/201; 224/403, 224/404; 296/37.1, 37.6
See application file for complete search history.

(56) References Cited

U.S. PATENT DOCUMENTS

| 3,016,968 | A | * | 1/1962 | Roberts, Jr. et al. ........ 180/89.1 |
| 3,113,447 | A | * | 12/1963 | Oishei ......................... 70/262 |
| 5,058,258 | A | * | 10/1991 | Harvey ....................... 29/401.1 |
| 5,123,691 | A | | 6/1992 | Ginn |
| 5,148,691 | A | * | 9/1992 | Wallden ..................... 70/279.1 |
| 5,493,881 | A | * | 2/1996 | Harvey ......................... 70/277 |
| 5,531,086 | A | * | 7/1996 | Bryant ....................... 70/279.1 |
| 5,727,835 | A | | 3/1998 | Krush et al. |
| 6,081,186 | A | | 6/2000 | Adams |
| 6,409,064 | B1 | | 6/2002 | Bayley |
| 2004/0011097 | A1 | * | 1/2004 | Jeffers ....................... 70/279.1 |
| 2006/0112746 | A1 | * | 6/2006 | Thompson ................... 70/257 |

* cited by examiner

*Primary Examiner*—Lloyd A Gall (57) ABSTRACT

A remotely controlled lock apparatus is attached to a container, such as a tool box, that includes a container lid portion and a container body portion. The apparatus includes a manual key-operated cylinder connected to a wall of the container. A manually-operated lock latch assembly is supported by a wall of the container and includes a pivoted manually-operated lock latch member which includes a latch-to-container locking portion and a blocking-member abutment portion. A remotely controlled electrically powered linear mechanism assembly is connected to a wall of the container, and a dual latch control unit, is connected between the electrically powered linear mechanism assembly and the manually-operated lock latch assembly and between the manual key-operated cylinder and the manually-operated lock latch assembly, for selectively controlling locking and unlocking of the lock latch assembly by the electrically powered linear mechanism assembly or by the manual key-operated cylinder.

6 Claims, 11 Drawing Sheets

REMOTELY CONTROLLED TOOL BOX LOCK APPARATUS

BACKGROUND OF THE INVENTION

1. Field of the Invention

The present invention relates generally to lockable tool boxes carried by motor vehicles, and, more particularly, to lockable tool boxes which can be locked and unlocked by remote control.

2. Description of the Prior Art

Lockable tool boxes that are carried by motor vehicles are well known in the art. In this respect, throughout the years, a number of innovations have been developed relating to lockable tool boxes that are carried by motor vehicles, and the following U.S. patents are representative of some of those innovations: U.S. Pat. Nos. 5,123,691, 5,727,835,and 6,409,064.

More specifically, U.S. Pat. No. 5,123,691 discloses an electric lock apparatus for a vehicular tool box. Two means are provided for controlling a latch. One means include a key-operated lock. The other means include an electric motor and gear system. The providing both manual means and electrical means for controlling a lock for a tool box is a very desirable feature. To implement this apparatus, a rotatable gear is installed on the key-operated lock. Also, a complementary rotatable gear is installed on an electric motor, and this complementary gear engages the gear on the key-operated lock. It is noted that the need to install a gear on a key operated lock and the need to install a complementary gear on a motor makes it very difficult to use the principles of this apparatus to retrofit a conventional lockable tool box. In this respect, it would be desirable if a lockable tool box were provided which does not have the need to install a gear on a key operated lock and the need to install a complementary gear on a motor.

U.S. Pat. No. 5,727,835 discloses an alarmed truck mounted tool box in which both a key operated entry lock and a remotely operated solenoid lock release are provided. A flexible operation cable is employed between the solenoid and the lock release. Such a flexible cable provides a strong pulling action but does not provide a strong pushing action. In this respect, it would be desirable if a lockable tool box were provided which does not employ a flexible operation cable between a solenoid and a lock release.

U.S. Pat. No. 6,409,064 discloses a locking tool box which includes a remote control for raising and lowering the tool box lid portion with respect to the tool box container portion. No disclosure relates to providing both manual means and electrical means for controlling a lock for the tool box.

In addition, U.S. Pat. No. 6,081,186 may be of interest for its disclosure of a security system that is integrated into a door lock mechanism for a vehicle.

U.S. Pat. No. 6,155,616 may be of interest for its disclosure of a mechanical locking mechanism and closure assembly including the same.

As suggested hereinabove, it would be desirable to provide a remotely controlled lock apparatus that can be easily retrofitted to a conventional lockable tool box.

With reference to the PRIOR ART drawing FIGS. 1-4 herein, a particular type of lockable tool box 29 includes a key-operated cylinder lock which includes a key receiver lock portion 17, a key-controlled support 19, and a conventional latch motion blocking arm 15 attached to the key-controlled support 19. The key-operated cylinder lock is supported support plate 25. Also supported by the support plate 25 is a latch control handle 13, a lock latch pivot 21, and a manually-operated lock latch member 11 supported by the lock latch pivot 21. The support plate 25 is attached to a wall of the container. The manually-operated lock latch member 11 includes a latch-to-container locking portion 23. When a user pulls on the latch control handle 13 to unlock the tool box lid portion 31 of a lockable tool box 29, the latch control handle 13 causes a rotational movement of the manually-operated lock latch member 11 around the lock latch pivot 21.

In addition, the key-controlled conventional latch motion blocking arm 15 selectively blocks or permits rotational movement of the manually-operated lock latch member 11 around the lock latch pivot 21. When, the conventional latch motion blocking arm 15 is in locking position, shown in FIG. 3, the manually-operated lock latch member 11 is prevented from rotating out of a locking position. That is, a blocking-member abutment portion 37 of the manually-operated lock latch member 11 abuts the conventional latch motion blocking arm 15 in the locking position. Also, in the locking position, the latch-to-container locking portion 23 of the manually-operated lock latch member 11 is in locking engagement with a container-to-latch locking portion 35 on the lockable tool box 29.

Figure 4:
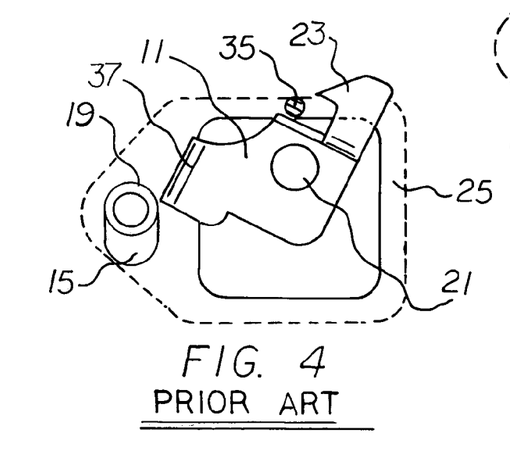
FIG. 4 is an inside view of the portion of the PRIOR ART lockable tool box shown in FIG. 2, wherein a lock latch member and a conventional latch motion blocking arm are in an unlocked position, wherein the conventional latch motion blocking arm does not prevent the lock latch member from rotating around the lock latch pivot, whereby the latch-to-container locking portion moves out of locking engagement with the container-to-latch locking portion.

On the other hand, when the conventional latch motion blocking arm 15 is in an unlocking position, as shown in FIG. 4, the conventional latch motion blocking arm 15 is not in contact with the blocking-member abutment portion 37 of the manually-operated lock latch member 11, and the manually-operated lock latch member 11 is permitted to rotate around the lock latch pivot 21, such that the latch-to-container locking portion 23 disengages from a container-to-latch locking portion 35 and permits opening of the lockable tool box 29.

In view of the popularity of the conventional key-operated tool box lock shown in FIGS. 1-4, it would be desirable if a remotely controlled lock apparatus were provided that could easily be used to retrofit a key-operated tool box lock which includes a latch control handle and a pivoted lock latch member which includes a latch-to-container locking portion.

Thus, while the foregoing body of prior art indicates it to be well known to use tool box locks, the prior art described above does not teach or suggest a remotely controlled tool box lock apparatus which has the following combination of desirable features: (1) provides both manual means and electrical means for controlling a lock for a tool box; (2) does not have the need to install a gear on a key-operated lock and does not have the need to install a complementary gear on a motor; (3) does not employ a flexible operation cable between a solenoid and a lock release; (4) provides a remotely controlled lock apparatus that can be easily retrofitted to a conventional lockable tool box; and (5) can easily be used to retrofit a key-operated tool box lock which includes a latch control handle and a handle-operated pivoted lock latch member which includes a latch-to-container locking portion for engaging a container-to-latch locking portion. The foregoing desired characteristics are provided by the unique remotely controlled tool box lock apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a remotely controlled lock apparatus which is attached to a container that includes a container lid portion and a container body portion, is comprised of a manual key-operated cylinder is connected to a wall of the container. The manual key-operated cylinder includes a key receiver lock portion. A manually-operated key-controlled pusher arm support is connected to the key receiver lock portion, and a manually-operated control stop pusher arm is connected to the manually-operated key-controlled pusher arm support. A manually-operated lock latch assembly supported by a wall of the container. The manually-operated lock latch assembly includes a manually-operated lock latch member and a lock latch pivot which supports the manually-operated lock latch member. The manually-operated lock latch member includes a latch-to-container locking portion and a blocking-member abutment portion. A remotely controlled electrically powered linear mechanism assembly is connected to a wall of the container, and a dual latch control unit, is connected between the electrically powered linear mechanism assembly and the manually-operated lock latch assembly and between the manual key-operated cylinder and the manually-operated lock latch assembly, for selectively controlling locking and unlocking of the lock latch assembly by the electrically powered linear mechanism assembly or by the manual key-operated cylinder.

Preferably, the dual latch control unit rotates around the manually-operated key-controlled pusher arm support when either the remotely controlled electrically powered linear mechanism assembly or the manual key-operated cylinder is used for locking and unlocking of the manually-operated lock latch assembly. A preferred container is a lockable tool box.

Preferably, the dual latch control unit includes a ring-shaped dual control base portion received around the manually-operated key-controlled pusher arm support. A dual controlled latch motion blocking member is connected to the dual control base portion. A first manual control stop and a second manual control stop are connected to the dual control base portion, and a linear mechanism assembly engagement portion is connected to the dual control base portion.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least six preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved remotely controlled tool box lock apparatus which has all of the advantages of the prior art and none of the disadvantages.

It is another object of the present invention to provide a new and improved remotely controlled tool box lock apparatus which may be easily and efficiently manufactured and marketed.

It is a further object of the present invention to provide a new and improved remotely controlled tool box lock apparatus which is of durable and reliable construction.

An even further object of the present invention is to provide a new and improved remotely controlled tool box lock apparatus which is susceptible of a low cost of manufacture with regard to both materials and labor, and which accordingly is then susceptible of low prices of sale to the consuming public, thereby making such remotely controlled tool box lock apparatus available to the buying public.

Still yet a further object of the present invention is to provide a new and improved remotely controlled tool box lock apparatus which provides both manual means and electrical means for controlling a lock for a tool box.

Still another object of the present invention is to provide a new and improved remotely controlled tool box lock apparatus that does not have the need to install a gear on a key-operated lock and does not have the need to install a complementary gear on a motor.

Yet another object of the present invention is to provide a new and improved remotely controlled tool box lock apparatus which does not employ a flexible operation cable between a solenoid and a lock release.

Even another object of the present invention is to provide a new and improved remotely controlled tool box lock apparatus that provides a remotely controlled lock apparatus that can be easily retrofitted to a conventional lockable tool box.

Still a further object of the present invention is to provide a new and improved remotely controlled tool box lock apparatus which can easily be used to retrofit a key-operated tool box lock which includes a latch control handle and a handle-operated pivoted lock latch member which includes a latch-to-container locking portion for engaging a container-to-latch locking portion.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With respect to the drawings, FIGS. 1-4 relate to a PRIOR ART lockable tool box 29 that is carried by a motor vehicle, which does not includes a remotely controlled lock apparatus of the invention. In each of the figures, reference numerals are shown that correspond to like reference numerals that designate like elements shown in other figures.

Figure 1:
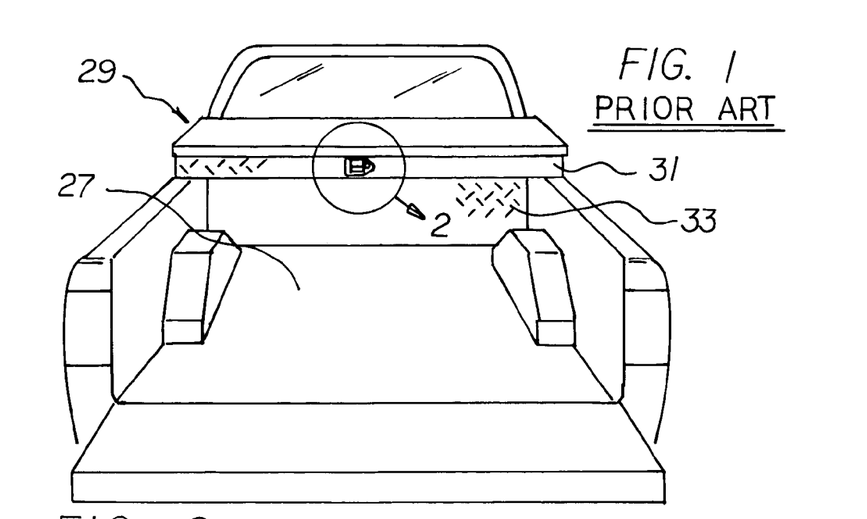
FIG. 1 is a rear perspective view showing a PRIOR ART lockable tool box that is carried by a motor vehicle, which does not include a remotely controlled lock apparatus of the invention.
Figure 2:
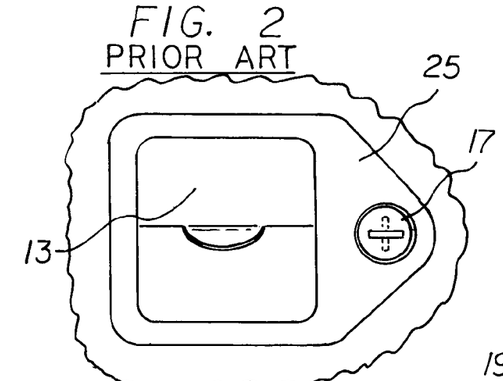
FIG. 2 is an enlarged rear view of the portion of the PRIOR ART lockable tool box that is shown in circled region 2 of FIG. 1.
Figure 3:
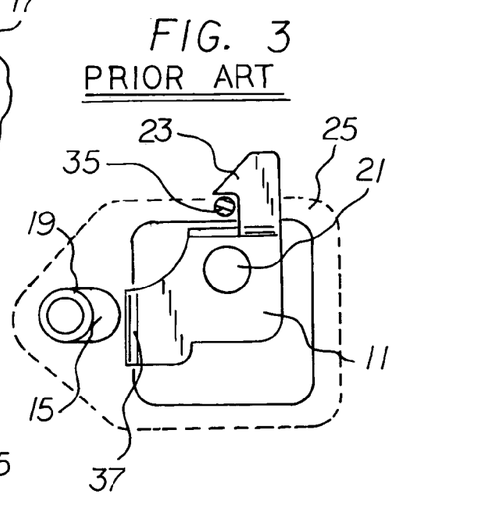
FIG. 3 is an inside view of the portion of the PRIOR ART lockable tool box shown in FIG. 2, wherein a lock latch member and a conventional latch motion blocking arm are in a locked position, so that the conventional latch motion blocking arm prevents the lock latch member from rotating around the lock latch pivot, whereby a lock latch member mounted latch-to-container locking portion remains in locking engagement with a container lid mounted container-to-latch-locking portion.

In FIG. 3, a manually-operated latch member 11 and a conventional latch motion blocking arm 15 are in a locked position, so that the conventional latch motion blocking arm 15 prevents the manually-operated lock latch member 11 from rotating around the lock latch pivot 21, whereby a latch-to-container locking portion 23 of the manually-operated lock latch member 11 remains in locking engagement with a container-to-latch locking portion 35 that is mounted on a tool box lid portion 31. With the latch-to-container locking portion 23 is in locking engagement with the container-to-latch locking portion 35, the tool box lid portion 31 cannot be lifted off of the tool box container body portion 33.

In FIG. 4, the manually-operated lock latch member 11 and the conventional latch motion blocking arm 15 are in an unlocked position. The conventional latch motion blocking arm 15 does not prevent the manually-operated lock latch member 11 from rotating around the lock latch pivot 21, whereby the latch-to-container locking portion 23 moves out of locking engagement with the container-to-latch locking portion 35. When the latch-to-container locking portion 23 moves out of locking engagement with the container-to-latch locking portion 35, the tool box lid portion 31 can be lifted up with respect to the tool box container body portion 33.

FIGS. 5-17 relate to various preferred embodiments of the remotely controlled lock apparatus 10 of the invention.

Generally, A remotely controlled lock apparatus 10 attached to a container that includes a container lid portion 31 and a container body portion 33, is comprised of a manual key-operated cylinder is connected to a wall of the container. The manual key-operated cylinder includes a key receiver lock portion 17. A manually-operated key-controlled pusher arm support 19 is connected to the key receiver lock portion 17, and a manually-operated control stop pusher arm 24 is connected to the manually-operated key-controlled pusher arm support 19. A manually-operated lock latch assembly 57 supported by a wall of the container. The manually-operated lock latch assembly 57 includes a manually-operated lock latch member 11 and a lock latch pivot 21 which supports the manually-operated lock latch member 11. The manually-operated lock latch member 11 includes a latch-to-container locking portion 23 and a blocking-member abutment portion 37. A remotely controlled electrically powered linear mechanism assembly 36 is connected to a wall of the container, and a dual latch control unit 12, is connected between the electrically powered linear mechanism assembly 36 and the manually-operated lock latch assembly 57 and between the manual key-operated cylinder and the manually-operated lock latch assembly 57, for selectively controlling locking and unlocking of the lock latch assembly 57 by the electrically powered linear mechanism assembly 36 or by the manual key-operated cylinder. More specifically, a bracket 62 can be attached to a wall of the container, and attachment bolts 60 can be used to attach the remotely controlled electrically powered linear mechanism assembly 36 to the bracket 62.

The dual latch control unit 12 rotates around the manually-operated key-controlled pusher arm support 19 when either the remotely controlled electrically powered linear mechanism assembly 36 or the manual key-operated cylinder is used for locking and unlocking of the manually-operated lock latch assembly 57. A preferred container is a lockable tool box 29.

A lock nut 58 is affixed to the manually-operated key-controlled pusher arm support 19 and secures the dual latch control unit 12 onto the manually-operated key-controlled pusher arm support 19 of the manual key-operated cylinder, while at the same time permitting rotation of the dual latch control unit 12 around the manually-operated key-controlled pusher arm support 19.

Preferably, the dual latch control unit 12 includes a ring-shaped dual control base portion 14 received around the manually-operated key-controlled pusher arm support 19. A dual controlled latch motion blocking member 16 is connected to the dual control base portion 14. A first manual control stop 18 and a second manual control stop 20 is connected to the dual control base portion 14, and a linear mechanism assembly engagement portion 22 is connected to the dual control base portion 14.

The dual controlled latch motion blocking member 16 is positioned on the dual control base portion 14 so that the dual controlled latch motion blocking member 16 abuts the blocking-member abutment portion 37 of the manually-operated lock latch member 11 when either the remotely controlled electrically powered linear mechanism assembly 36 or the manual key-operated cylinder is selected to lock the manually-operated lock latch assembly 57.

Similarly, the dual controlled latch motion blocking member 16 positioned on the dual control base portion 14 so that the dual controlled latch motion blocking member 16 moved away from abutment with the blocking-member abutment portion 37 of the manually-operated lock latch member 11 when either the remotely controlled electrically powered linear mechanism assembly 36 or the manual key-operated cylinder is selected to permit unlocking of the manually-operated lock latch assembly 57.

In addition, the first manual control stop 18 is positioned on the dual control base portion 14 so that, when the manual key-operated cylinder is operated to unlock the manually-operated lock latch assembly 57, the manually-operated control stop pusher arm 24 pushes on the first manual control stop 18 to move the dual controlled latch motion blocking member 16 away from abutment with the blocking-member abutment portion 37 of the manually-operated lock latch member 11 to permit unlocking of the manually-operated lock latch member 11.

Further, the second manual control stop 20 is positioned on the dual control base portion 14 so that, when the manual key-operated cylinder is operated to lock the manually-operated lock latch assembly 57, the manually-operated control stop pusher arm 24 pushes on the second manual control stop 20 to move the dual controlled latch motion blocking member 16 into abutment position with the blocking-member abutment portion 37 of the manually-operated lock latch member 11 to provide for locking of the manually-operated lock latch member 11.

In addition, the linear mechanism assembly engagement portion 22 is positioned on the dual control base portion 14 so that when the remotely controlled electrically powered linear mechanism assembly 36 is in a contracted condition, the dual controlled latch motion blocking member 16 is in abutment with the blocking-member abutment portion 37 for locking the manually-operated lock latch member 11. Also, the position of the linear mechanism assembly engagement portion 22 on the dual control base portion 14 provides that when the remotely controlled electrically powered linear mechanism assembly 36 is in an extended condition, the dual controlled latch motion blocking member 16 is away from abutment with the blocking-member abutment portion 37 for permitting unlocking of the manually-operated lock latch member 11. In this respect, the positioning of the linear mechanism assembly engagement portion 22 on the dual control base portion 14 is related to the length of the stroke of the remotely controlled electrically powered linear mechanism assembly 36 is changing from the contracted to the extended condition, and vice versa.

The positions of the manual key-operated cylinder and the dual latch control unit 12 supported thereon, with respect to the walls of the container, are selected so that the dual controlled latch motion blocking member 16 can selectively be placed in abutment with or moved away from abutment with the blocking-member abutment portion 37 of the manually-operated lock latch member 11.

One of the key benefits of the remotely controlled lock apparatus 10 of the invention is the ability to retrofit a conventional lockable tool box 29 with a remotely controlled lock apparatus 10 of the invention.

In this respect, to retrofit a PRIOR ART lockable tool box 29, such as shown in FIGS. 1-4 into an embodiment of the invention, the conventional latch motion blocking arm 15 is removed from the conventional lock cylinder. Then, the lock nut 58 (shown in FIG. 10) is removed from the conventional lock cylinder. Then, the dual latch control unit 12 is placed around the conventional lock cylinder, and the lock nut 58 is reinstalled onto the lock cylinder thereby supporting the dual latch control unit 12 on the conventional lock cylinder. Then, the manually-operated control stop pusher arm 24 replaces the conventional latch motion blocking arm 15. A screw (not shown) can be used to secure the manually-operated control stop pusher arm 24 onto the conventional lock cylinder. It is noted that once the manually-operated control stop pusher arm 24 is installed on the conventional lock cylinder, the conventional lock cylinder is herein referred to as the manually-operated key-controlled pusher arm support 19 because it does in fact support the manually-operated control stop pusher arm 24. Then, the remotely controlled electrically powered linear mechanism assembly 36 is installed on a wall of the container and a free end of a linear actuator member 38 of the remotely controlled electrically powered linear mechanism assembly 36 is connected to the linear mechanism assembly engagement portion 22 of the dual latch control unit 12.

Figure 5:
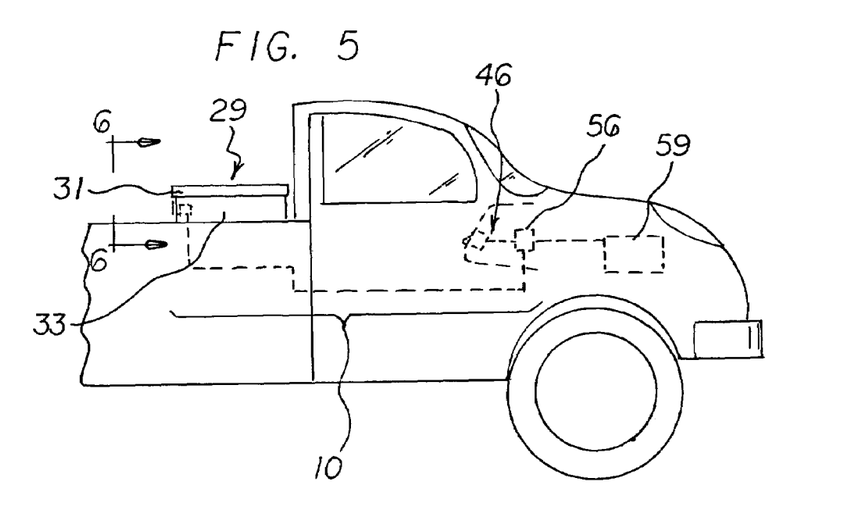
FIG. 5 is a side view of a first embodiment of the remotely controlled lock apparatus of the invention, wherein a remotely-mounted tool box lock motor control switch is located in the passenger compartment of a motor vehicle and wherein a lockable tool box includes portions of the remotely controlled lock apparatus.
Figure 6:
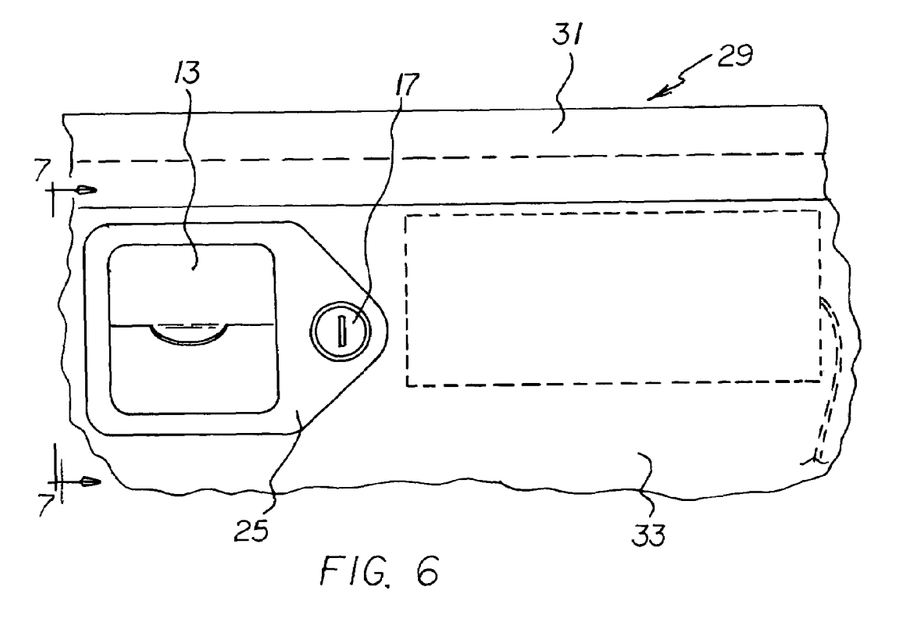
FIG. 6 is an enlarged rear view of the portion of the embodiment of the remotely controlled lock apparatus of the invention shown in FIG. 5, taken along line 6-6 thereof.
Figure 7:
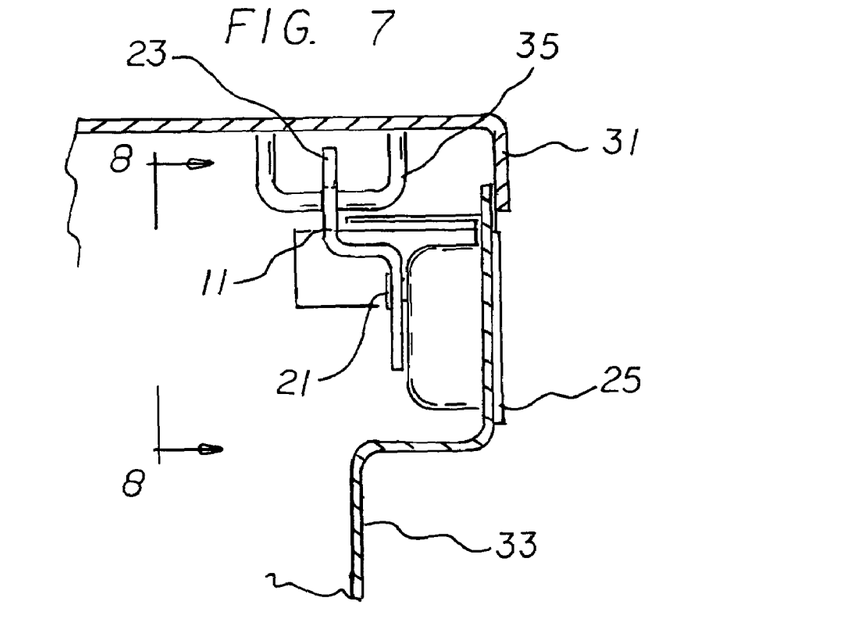
FIG. 7 is a cross-sectional view of the portion of the embodiment of the remotely controlled lock apparatus of the invention shown in FIG. 6, taken along line 7-7 thereof.

Electrical power for the remotely controlled electrically powered linear mechanism assembly 36 is preferably derived from a battery 59 of a motor vehicle, such as shown in FIG. 5. Also, a convenient way to obtain electrical power from the battery 59 is to use electrical connections 44 to the existing wire, harness as shown in FIGS. 14-17.

The remotely controlled electrically powered linear mechanism assembly 36 of the invention can take form in a variety of implementations. For example, the remotely controlled electrically powered linear mechanism assembly 36 can take the form of a solenoid which employs a coil and a plunger operated by the coil. A portion of the plunger serves as the linear actuator member 38. Alternatively, the remotely controlled electrically powered linear mechanism assembly 36 can take the form of an electric motor which has a linkage or transmission to provide linear motion to a linear element, and the element that undergoes linear motion serves as the linear actuator member 38.

More specifically, in the first embodiment of the invention shown in FIGS. 5-10 and 12, remotely-mounted tool box lock mechanism control switch 46 is located in the passenger compartment 55 of a motor vehicle. It is noted that the remotely-mounted tool box lock mechanism control switch 46 can take a number of forms. For example, one double pole switch can provide for both contraction and extension of the linear actuator member 38. As another example, two single poles switches can be provided, one for contraction and one for extension of the linear actuator member 38.

Preferably, the battery 59 of the motor vehicle powers a first switch-controlled tool-box-lock-mechanism-direction control relay 48 and a second switch-controlled tool-box-lock-mechanism-direction control relay 50 which are controlled by the remotely-mounted tool box lock mechanism control switch 46. When the remotely-mounted tool box lock mechanism control switch 46 is in the locking position, the first switch-controlled tool-box-lock-mechanism-direction control relay 48 controls the remotely controlled electrically powered linear mechanism assembly 36 which causes the dual controlled latch motion blocking member 16 to be in the abutment position with respect to the blocking-member abutment portion 37 of the manually-operated lock latch member 11.

When the remotely-mounted tool box lock mechanism control switch 46 is in the unlocking position, the second switch-controlled tool-box-lock-mechanism-direction control relay 50 controls the remotely controlled electrically powered linear mechanism assembly 36 so that the dual controlled latch motion blocking member 16 is not abutting the blocking-member abutment portion 37 of the manually-operated lock latch member 11.

Figure 8:
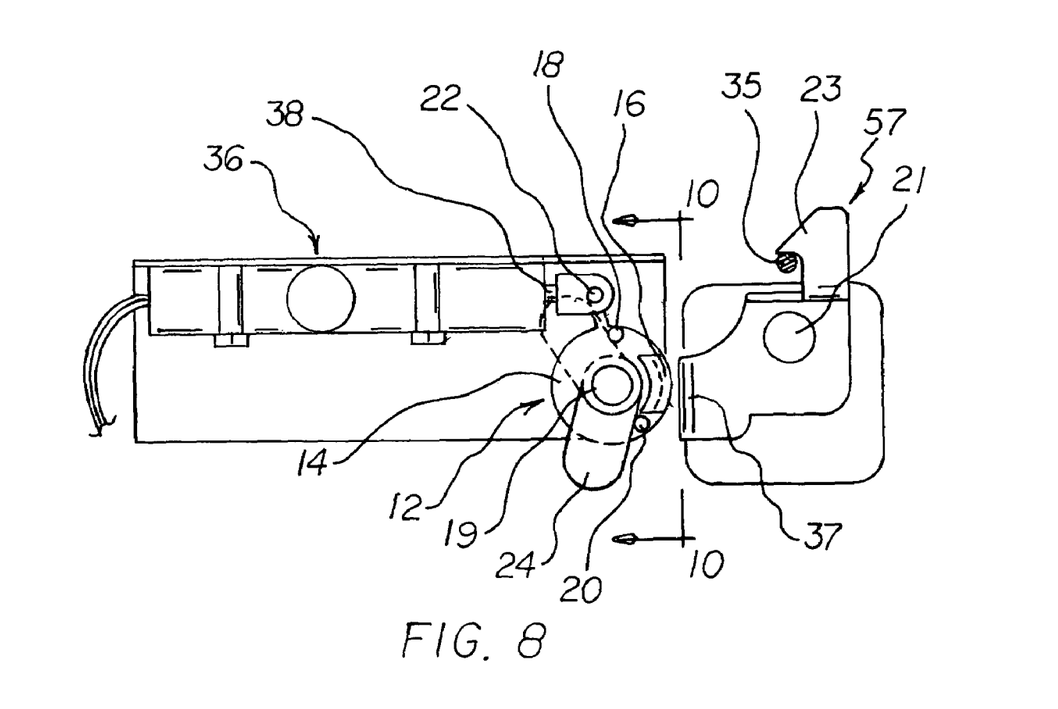
FIG. 8 is an inside view of the portion of the embodiment of the invention shown in FIG. 7, taken along line 8-8 thereof, wherein the linear actuator member is in a contracted condition, wherein the dual controlled latch motion blocking member is in a locking condition, and wherein the lock latch member is prevented from rotating around the lock latch pivot, so that the latch-to-container locking portion is prevented from disengaging from the container-to-latch-locking portion.

More specifically, as shown in FIG. 8, the linear actuator member 38 is in a contracted condition. The dual controlled latch motion blocking member 16 is in a locking condition. The dual controlled latch motion blocking member 16 abuts the blocking-member abutment portion 37 of the manually-operated lock latch member 11, and the manually-operated lock latch member 11 is prevented from rotating around the lock latch pivot 21, so that the latch-to-container locking portion 23 is prevented from disengaging from the container-to-latch-locking portion 35.

Figure 9:
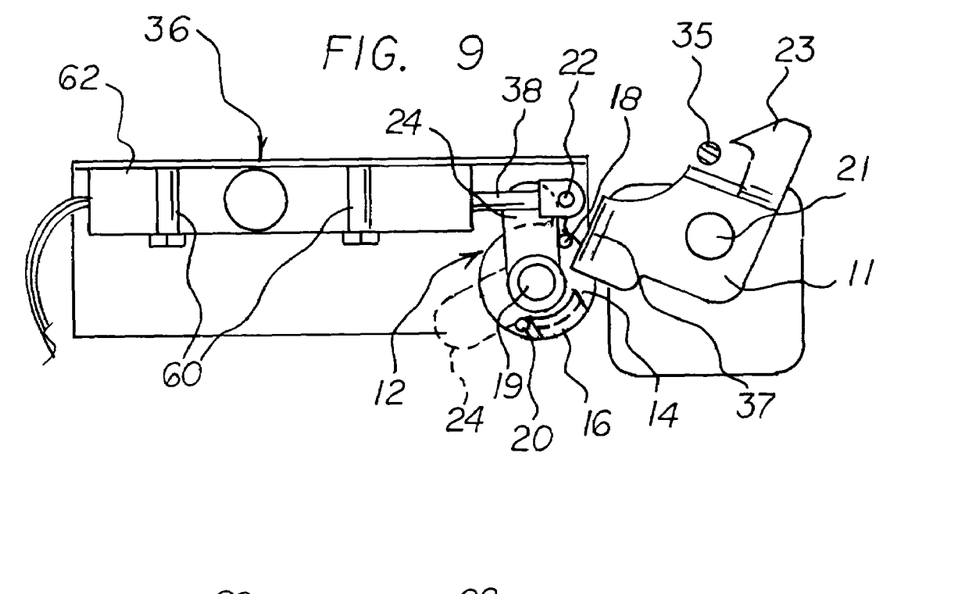
FIG. 9 is an inside view of the portion of the embodiment of the invention shown in FIG. 8, wherein the linear actuator member is in an extended condition, wherein the dual controlled latch motion blocking member is in an unlocked condition, and wherein the lock latch member is permitted to rotate around the lock latch pivot, so that the latch-to-container locking portion is permitted to disengage from the container-to-latch-locking portion.
Figure 10:
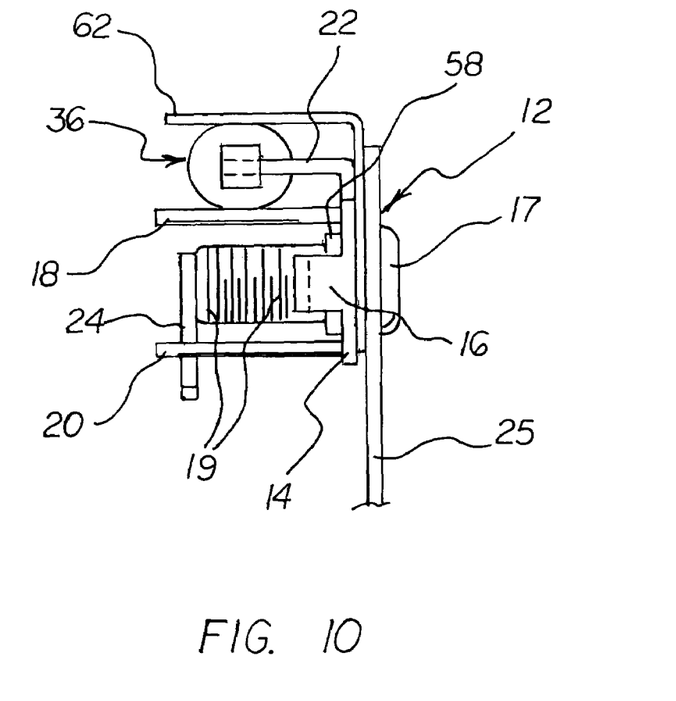
FIG. 10 is a cross-sectional view of the portion of the embodiment of the invention shown in FIG. 8, taken along line 10-10 thereof.

As shown in FIG. 9, the linear actuator member 38 is in an extended condition. The dual controlled latch motion blocking member 16 is in an unlocked condition. The dual controlled latch motion blocking member 16 does not abut the blocking-member abutment portion 37 of the manually-operated lock latch member 11, and the manually-operated lock latch member 11 is permitted to rotate around the lock latch pivot 21, so that the latch-to-container locking portion 23 is permitted to disengage from the container-to-latch-locking portion 35.

Figure 11:
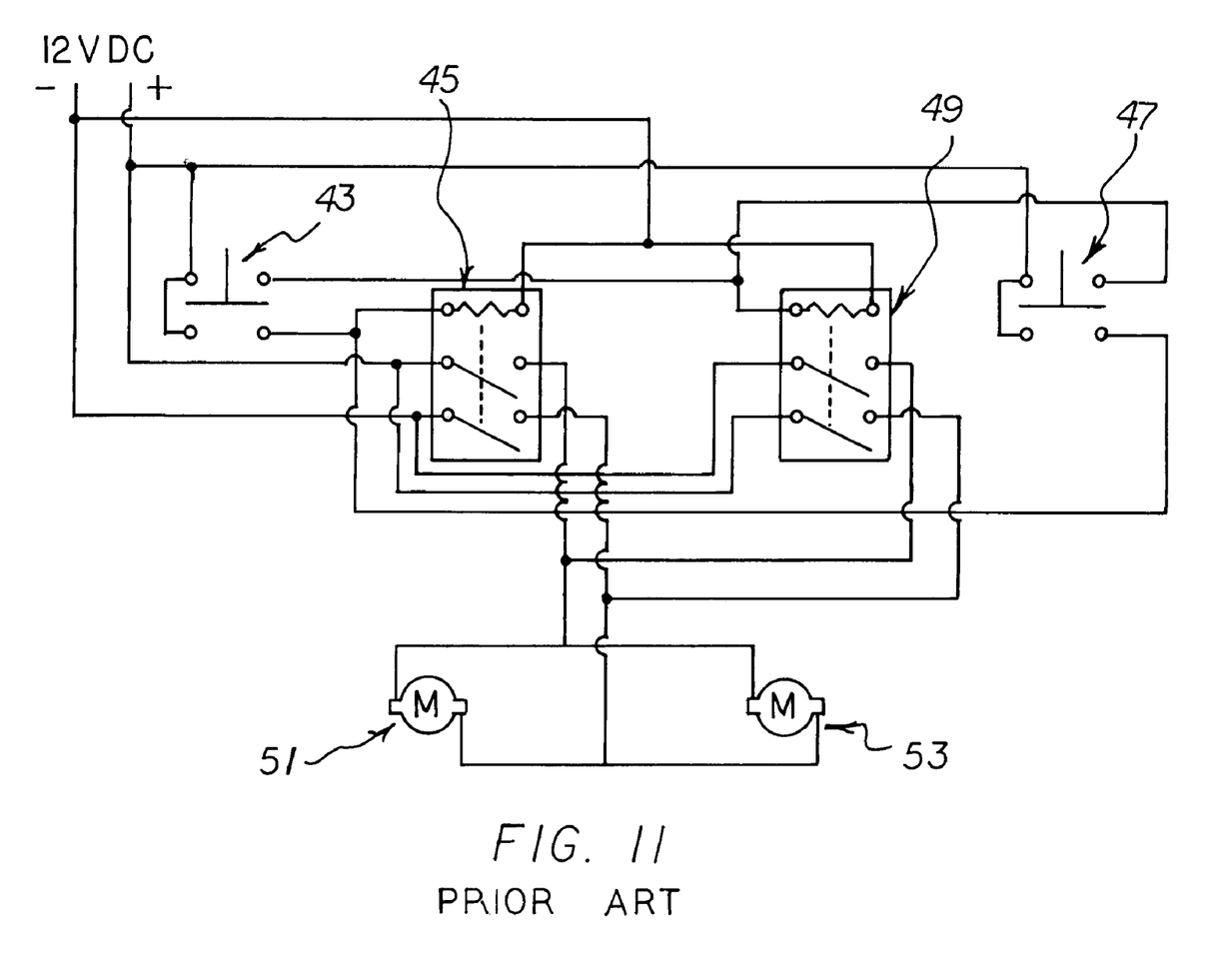
FIG. 11 is a schematic diagram of electrical circuitry for a PRIOR ART motor vehicle, which includes electric door locks, having door lock switches, door lock switching relays, and door lock motor units.

FIG. 11 is a schematic diagram of electrical circuitry for a PRIOR ART motor vehicle, which includes electric door locks, has a first door lock switch 43. A first door lock switching relay 45. A second door lock switch 47. A second door lock switching relay 49, and a first door lock mechanism unit 51 and a second door lock mechanism unit 53. The first door lock switch 43, the first door lock switching relay 45, the second door lock switch 47, the second door lock switching relay 49, the first door lock mechanism unit 51, and the second door lock mechanism unit 53 operate in a conventional way.

Figure 12:
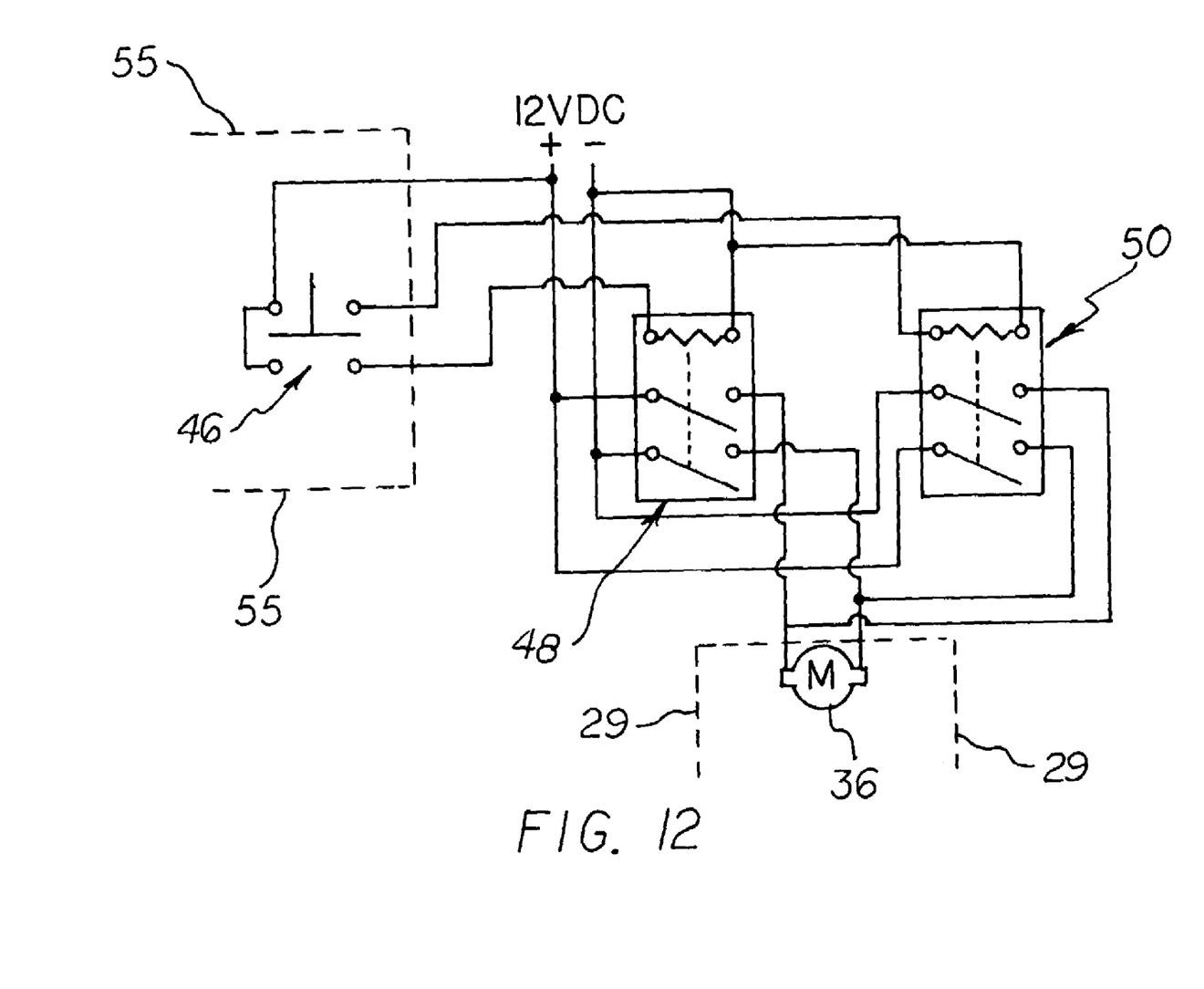
FIG. 12 is a schematic diagram of electrical circuitry for a motor vehicle, which does not include electric door locks, having a first embodiment of a remotely controlled lock apparatus of the invention which includes a remotely-mounted tool box lock motor control switch, a first switch-controlled tool-box-lock-motor-direction control relay, a second switch-controlled tool-box-lock-motor-direction control relay, and an electrical power driven motor/transmission assembly.

FIG. 12 is a schematic diagram of electrical circuitry for a motor vehicle, which does not includes electric door locks, has, as described above, the first embodiment of a remotely controlled lock apparatus of the invention, shown in FIGS. 5-10. The remotely-mounted tool box lock mechanism control switch 46 can be located in the passenger compartment 55. The electrically powered linear mechanism assembly 36 is located in the lockable tool box 29. The first switch-controlled tool-box-lock-mechanism-direction control relay 48 and the second switch-controlled tool-box-lock-mechanism-direction control relay 50 can be located in any desired location, such as in the passenger compartment 55 or in the lockable tool box 29 or in a relay-housing compartment 56 under the hood of the vehicle, as shown in FIG. 5.

Figure 13:
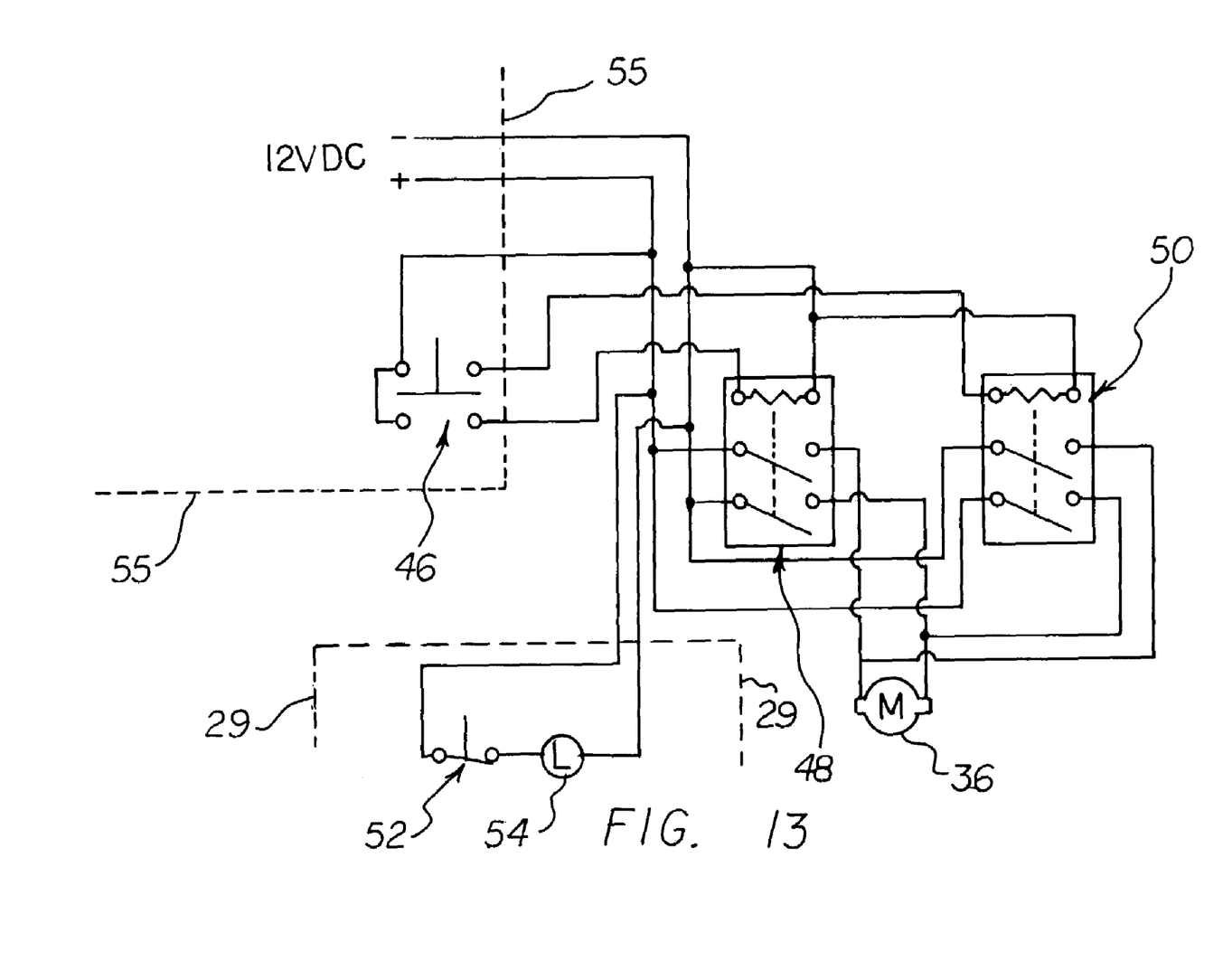
FIG. 13 is a schematic diagram of electrical circuitry for a motor vehicle, which does not include electric door locks, having a second embodiment of a remotely controlled lock apparatus of the invention, similar to the embodiment shown in FIG. 12, which additionally includes a tool-box-lid-mounted light switch and an illumination lamp which is actuated when the tool-box-lid-mounted light switch is actuated.

FIG. 13 is a schematic diagram of electrical circuitry for a motor vehicle, which does not includes electric door locks, has a second embodiment of a remotely controlled lock apparatus of the invention, similar to the embodiment shown in FIG. 12, which additionally includes a tool-box-lid-mounted light switch 52 and an illumination lamp 54 which is actuated when tool-box-lid-mounted light switch 52 is actuated. The tool-box-lid-mounted light switch 52 and the illumination lamp 54 derive electrical power from the battery 59.

Figure 14:
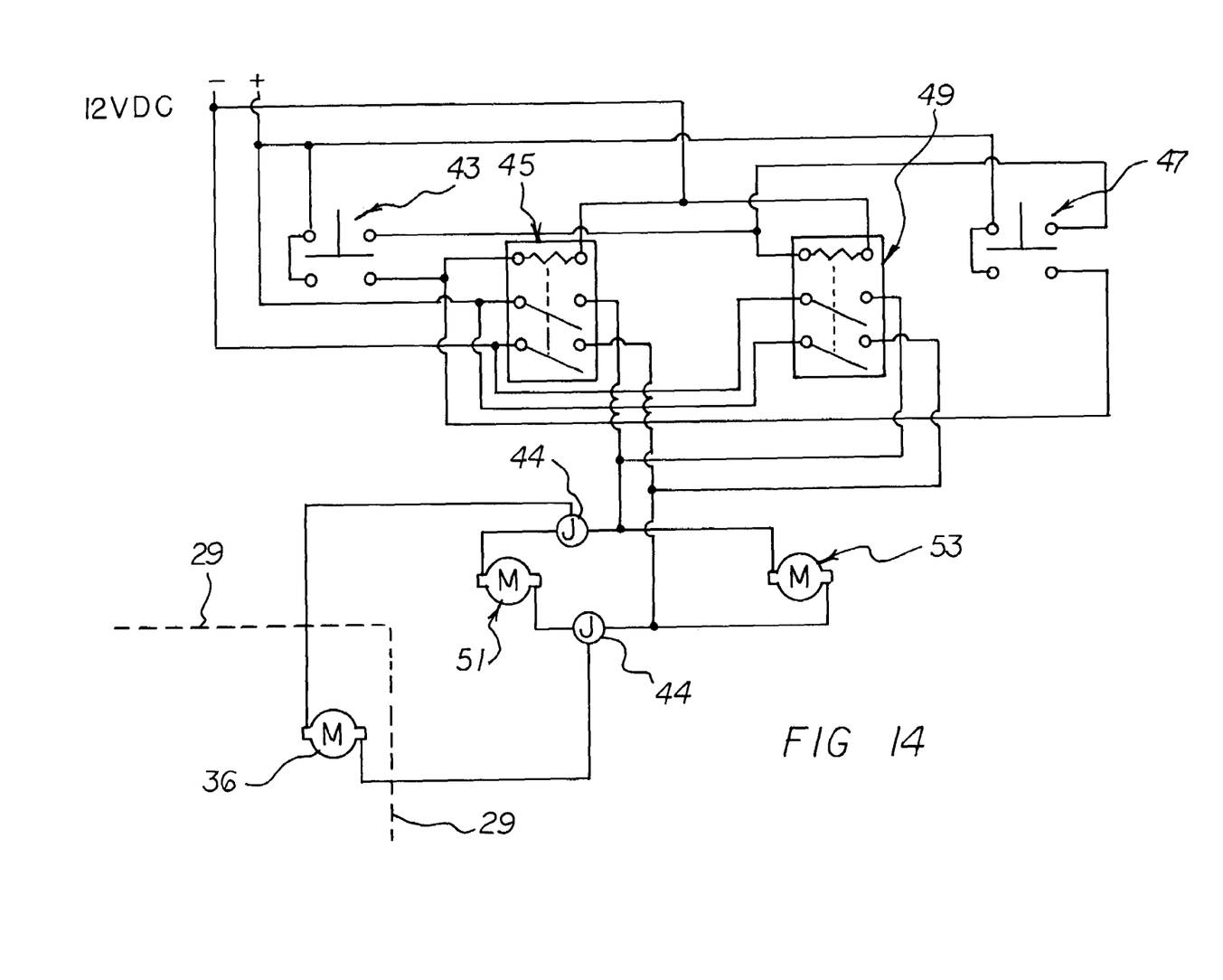
FIG. 14 is a schematic diagram of electrical circuitry for a motor vehicle, which includes electric door locks such as shown in FIG. 11, having a third embodiment of a remotely controlled lock apparatus of the invention which includes an electrical power driven motor/transmission assembly which is actuated when a door lock switch of the electric door locks is activated, and which includes electrical connections to an existing wire harness for the electric door locks.

FIG. 14 is a schematic diagram of electrical circuitry for a motor vehicle, which includes electric door locks such as shown in FIG. 11, has a third embodiment of a remotely controlled lock apparatus of the invention which includes an electrically powered linear mechanism assembly 36 which is actuated when a door lock switch of the electric door locks is activated, and which includes electrical connections 44 to an existing wire harness for the electric door locks. This embodiment of the invention shows that each of the first door lock switch 43 and the second door lock switch 47 can serve as a remotely-mounted tool box lock motor control switch (in the place of a separate and distinct remotely-mounted tool box lock mechanism control switch 46) for controlling the electrically powered linear mechanism assembly 36 in the lockable tool box 29. More specifically, in this respect, with this embodiment, there is no need for a separate and distinct remotely-mounted tool box lock motor control switch 46 to be mounted in the passenger compartment 55. This embodiment of the invention also shows that the electrically powered linear mechanism assembly 36 derives electrical power through the wiring harness using the electrical connections 44 to existing wire harness.

Figure 15:
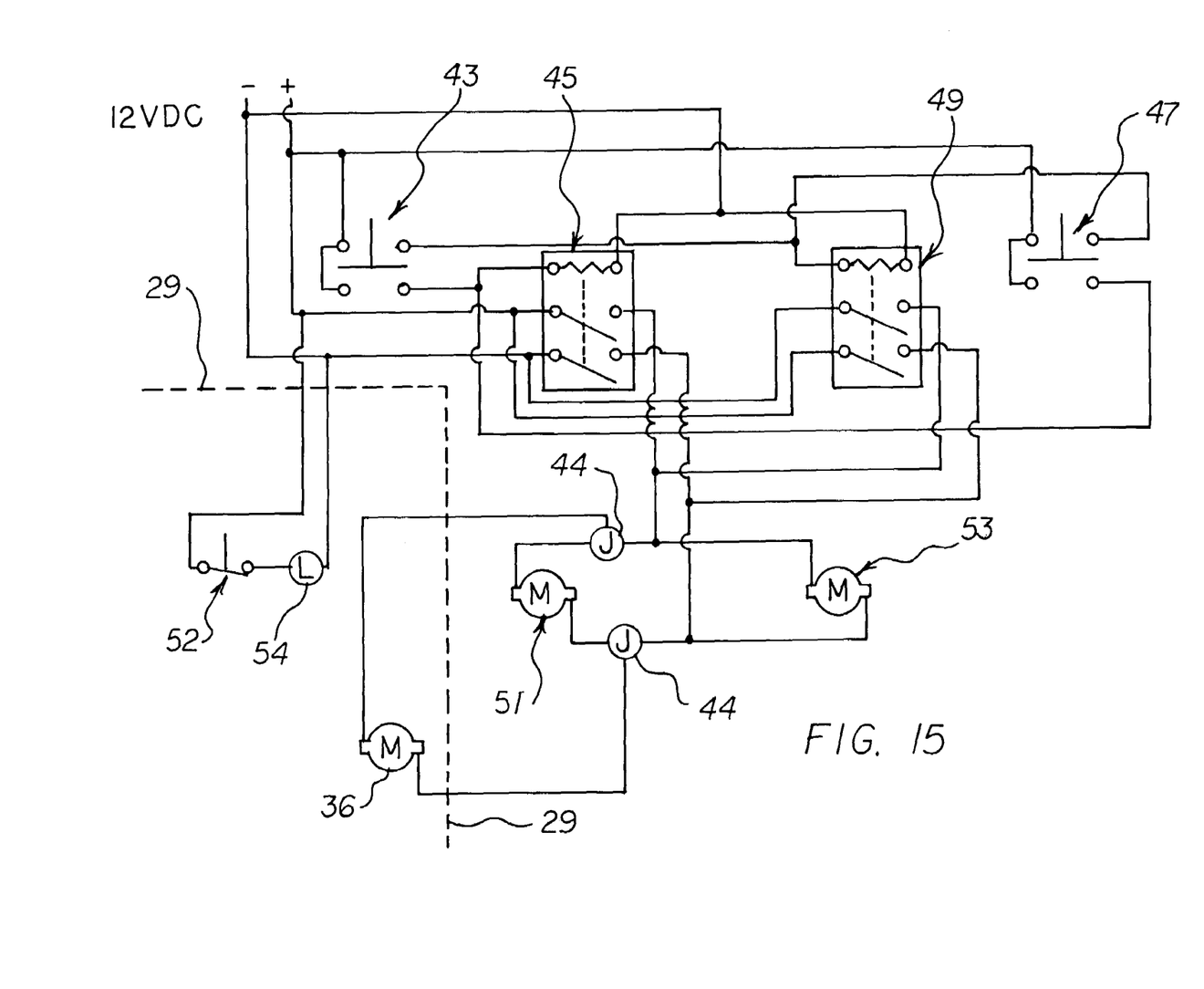
FIG. 15 is a schematic diagram of electrical circuitry for a motor vehicle, which includes a fourth embodiment of the invention similar to the embodiment shown in FIG. 14, which further includes a tool-box-lid-mounted light switch and an illumination lamp.

FIG. 15 is a schematic diagram of electrical circuitry for a motor vehicle, which includes a fourth embodiment of the invention similar to the embodiment shown in FIG. 14, which further includes a tool-box-lid-mounted light switch 52 and an illumination lamp 54 that is controlled by the tool-box-lid-mounted light switch 52.

Figure 16:
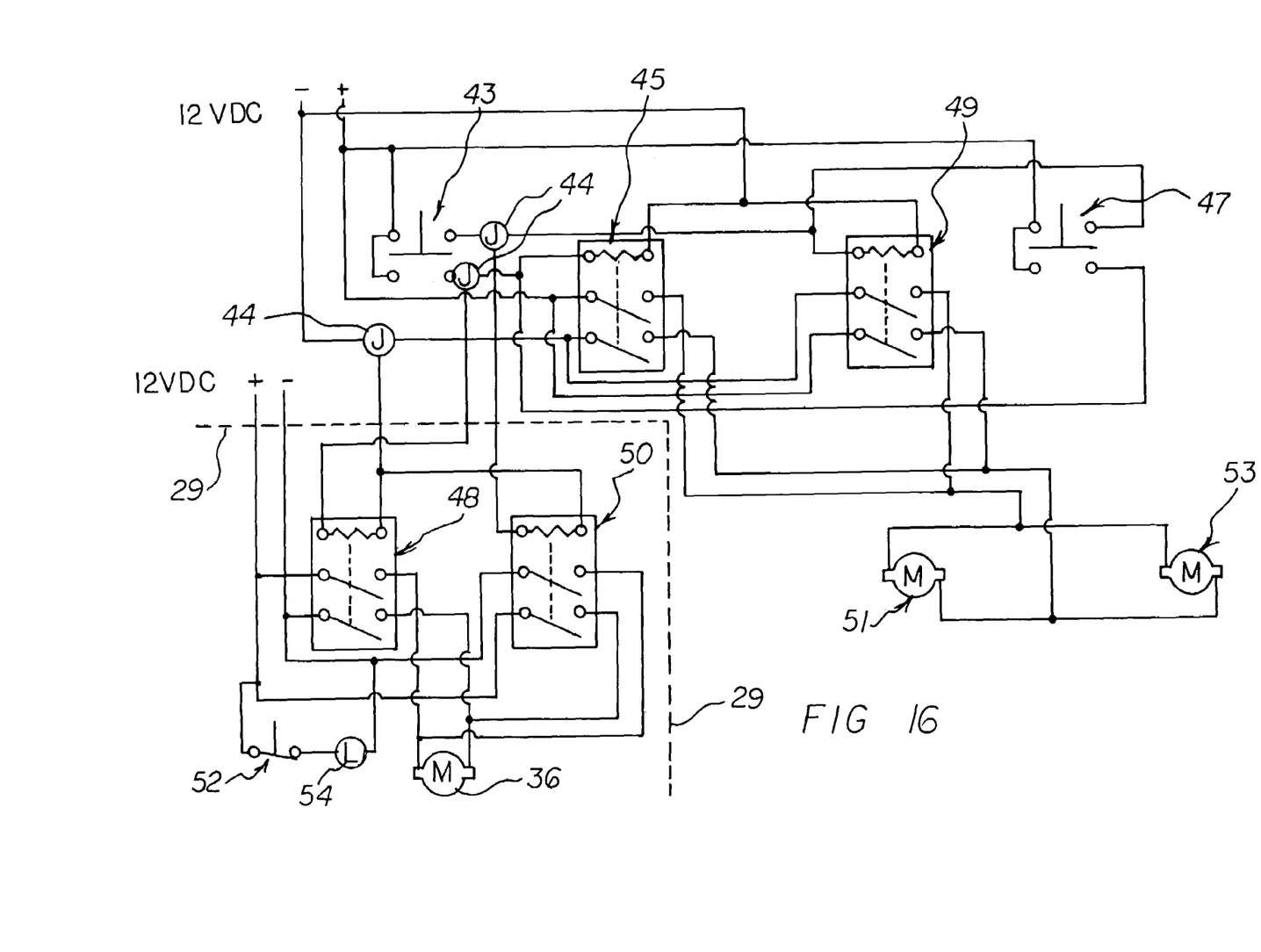
FIG. 16 is a schematic diagram of electrical circuitry for a motor vehicle, which includes a fifth embodiment of the invention similar to the embodiment shown in FIG. 15, which further includes a first switch-controlled tool-box-lock-motor-direction control relay and a second switch-controlled tool-box-lock-motor-direction control relay located in the lockable tool box.

FIG. 16 is a schematic diagram of electrical circuitry for a motor vehicle, which includes a fifth embodiment of the invention similar to the embodiment shown in FIG. 15, which further includes a first switch-controlled tool-box-lock-mechanism-direction control relay 48 and a second switch-controlled tool-box-lock-mechanism-direction control relay 50 located in the lockable tool box 29. This is in contrast with using a relay-housing compartment 56, such as shown in FIG. 5, for housing the first switch-controlled tool-box-lock-mechanism-direction control relay 48 and the second switch-controlled tool-box-lock-mechanism-direction control relay 50. With this embodiment, either of the first door lock switch 43 or the second door lock switch 47 serves in place of a separate and distinct remotely-mounted tool box lock mechanism control switch 46 for operating the first switch-controlled tool-box-lock-mechanism-direction control relay 48 and the second switch-controlled tool-box-lock-mechanism-direction control relay 50 for controlling operation of the remotely controlled electrically powered linear mechanism assembly 36, as described above.

Figure 17:
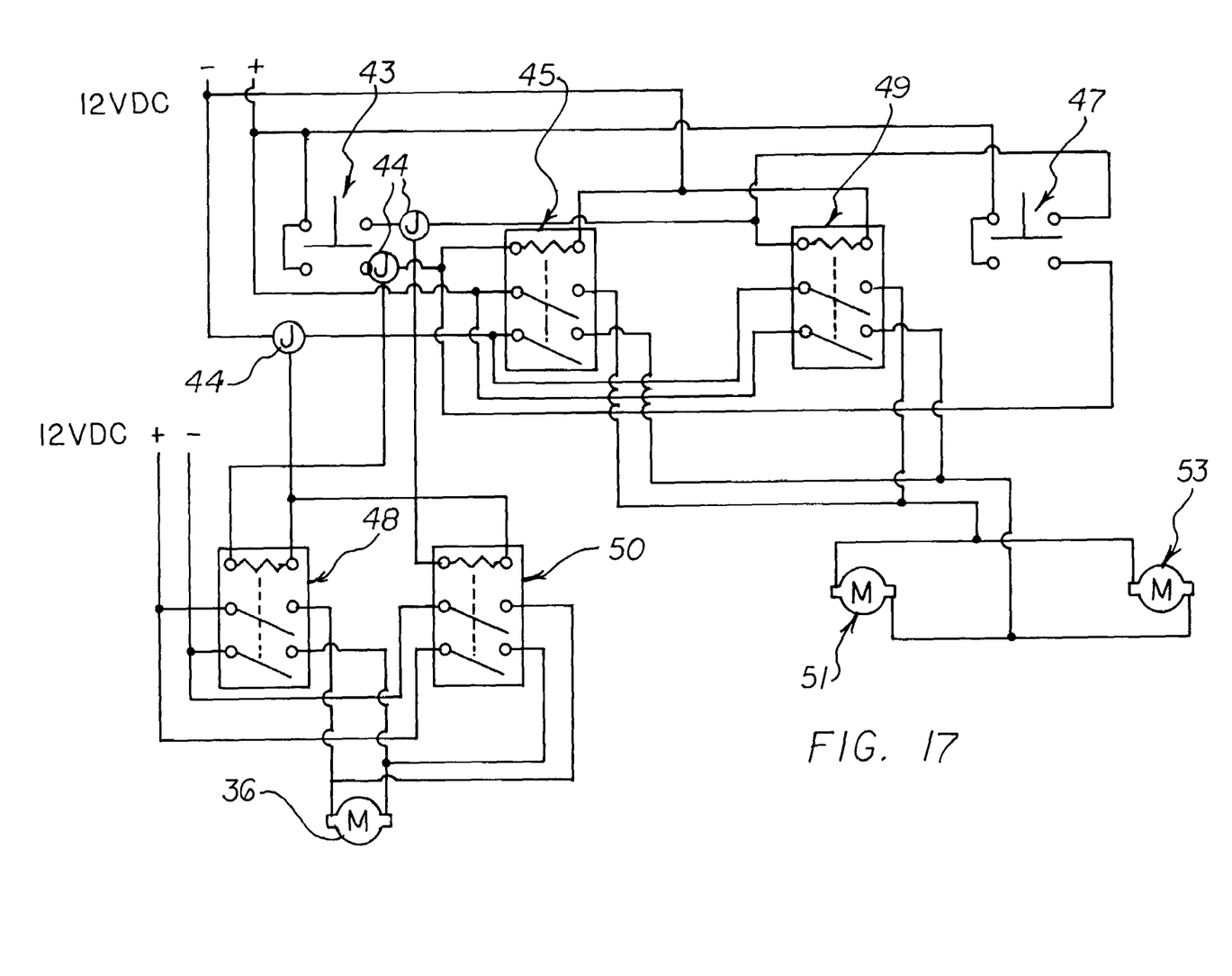
FIG. 17 is a schematic diagram of electrical circuitry for a motor vehicle, which includes a sixth embodiment of the invention similar to the embodiment shown in FIG. 16, which does not include a tool-box-lid-mounted light switch and does not include an illumination lamp.

FIG. 17 is a schematic diagram of electrical circuitry for a motor vehicle, which includes a sixth embodiment of the invention similar to the embodiment shown in FIG. 16, but which does not includes a tool-box-lid-mounted light switch 52 and does not includes an illumination lamp 54.

The remotely-mounted tool box lock mechanism control switch 46 can be located anywhere in the passenger compartment 55, for example, on the dashboard, under the dashboard, under the seat, etc. Also, if desired, the remotely-mounted tool box lock mechanism control switch 46 can be placed outside the passenger compartment 55, for example, near the lockable tool box 29, under a fender, under a mat on the pickup truck, etc. If the key for the key lock is lost. A remotely-mounted tool box lock mechanism control switch 46 can be actuated to open the lockable tool box 29. Alternatively, if it is desired to use a key, then the key can be used.

The components of the remotely controlled tool box lock apparatus of the invention can be made from inexpensive and durable metal and plastic materials and electrical components.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved remotely controlled tool box lock apparatus that is low in cost, relatively simple in design and operation, and which may advantageously be used to provide both manual means and electrical means for controlling a lock for a tool box. With the invention, a remotely controlled tool box lock apparatus is provided which does not have the need to install a gear on a key-operated lock and does not have the need to install a complementary gear on a motor. With the invention, a remotely controlled tool box lock apparatus is provided which does not employ a flexible operation cable between a solenoid and a lock release. With the invention, a remotely controlled tool box lock apparatus provides a remotely controlled lock apparatus that can be easily retrofitted to a conventional lockable tool box. With the invention, a remotely controlled tool box lock apparatus is provided which can easily be used to retrofit a key-operated tool box lock which includes a latch control handle and a handle-operated pivoted lock latch member which includes a latch-to-container locking portion for engaging a container-to-latch locking portion.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

The invention claimed is:

1. A remotely controlled lock apparatus adapted to be attached to a container that includes a container lid portion and a container body portion, comprising in combination:

a manual key-operated cylinder adapted to be connected to a wall of the container, a manually-operated lock latch assembly adapted to be supported by a wall of the container, wherein said manually-operated lock latch assembly includes a manually-operated lock latch member and a lock latch pivot which supports said manually-operated lock latch member, wherein said manually-operated lock latch member includes a latch-to-container locking portion and a blocking-member abutment portion, a remotely controlled electrically powered linear mechanism assembly adapted to be connected to a wall of the container, and a dual latch control unit, connected between said electrically powered linear mechanism assembly and said manually-operated lock latch assembly and between said manual key-operated cylinder and said manually-operated lock latch assembly, for selectively controlling locking and unlocking of said lock latch assembly by said electrically powered linear mechanism assembly or by said manual key-operated cylinder, wherein said manual key-operated cylinder includes a key receiver lock portion, a manually-operated key-controlled pusher arm support connected to said key receiver lock portion, and a manually-operated control stop pusher arm connected to said manually-operated key-controlled pusher arm support, and wherein said dual latch control unit includes:

a ring-shaped dual control base portion received around said manually-operated key-controlled pusher arm support, a dual controlled latch motion blocking member connected to said ring-shaped dual control base portion, and at least one manual control stop connected to said dual control base portion, and said remotely controlled electrically powered linear mechanism assembly having a linear mechanism assembly engagement portion, said linear mechanism assembly engagement portion being connected to said ring-shaped dual control base portion, and wherein said linear mechanism assembly engagement portion connected to said ring-shaped dual control base portion is adapted to rotate said dual control base portion around said manually-operated key-controlled pusher arm support between a locking condition and an unlocking condition in response to an electrical signal generated from a remote location independent of operation of said manual key-operated cylinder, and wherein said at least one ring-shaped dual control base portion control stop is adapted to engage said manually-operated control stop pusher arm connected to said manually-operated key-controlled pusher arm support to cause said manual key-operated cylinder to move between a locking condition and an unlocking condition.

2. The apparatus of claim 1 wherein the container is a lockable tool box.

3. The apparatus of claim 2 wherein said lockable tool box is adapted to be mounted on a vehicle having doors, said doors having lockable locks thereon, said vehicle having an electrical control system for controlling said lockable locks on said doors of said vehicle and said remotely controlled electrically powered linear mechanism assembly is connected to said vehicle electrical control system for operation when the doors of said vehicle are locked or unlocked.

4. The apparatus of claim 2 wherein said tool box has a lid adapted to be opened and closed and said apparatus further includes: a tool-box-lid-mounted light switch and an illumination lamp that is controlled by the tool-box-lid-mounted light switch.

5. The apparatus of claim 3 wherein said vehicle has a passenger compartment remotely located with respect to said lockable tool box, said passenger compartment having a remotely-mounted tool box lock control switch located in said passenger compartment, and said electrically powered linear mechanism assembly is adapted to be located in the lockable tool box.

6. The apparatus of claim 3 wherein said vehicle has a passenger compartment remotely located with respect to said lockable tool box and a remotely-mounted tool box lock control switch, wherein said remotely-mounted tool box lock control switch is located outside said passenger compartment.

* * * * *